(12) United States Patent
Khan et al.

(10) Patent No.: US 8,788,686 B1
(45) Date of Patent: Jul. 22, 2014

(54) CONTINUOUS CLOUD COMPUTING SESSIONS USING HANDHELD MOBILE COMMUNICATION DEVICE INTERFACED TO DIFFERENT KIOSKS

(75) Inventors: Azam Khan, Franklin Park, NJ (US); Lenworth Gordon, Mountainside, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 232 days.

(21) Appl. No.: 13/095,398

(22) Filed: Apr. 27, 2011

(51) Int. Cl.
*G06F 15/16* (2006.01)

(52) U.S. Cl.
USPC .......................... 709/229; 709/228; 370/229

(58) Field of Classification Search
USPC .................... 709/228, 229; 370/229
See application file for complete search history.

(56) References Cited

U.S. PATENT DOCUMENTS

| | | | |
|---|---|---|---|
| 2003/0102373 A1* | 6/2003 | Swartz et al. ................. | 235/383 |
| 2005/0055377 A1* | 3/2005 | Dorey et al. ............... | 707/104.1 |
| 2006/0004874 A1* | 1/2006 | Hutcheson et al. ........ | 707/104.1 |
| 2007/0174085 A1* | 7/2007 | Koo et al. .......................... | 705/2 |
| 2008/0005025 A1* | 1/2008 | Legere et al. .................... | 705/51 |
| 2009/0067325 A1* | 3/2009 | Baratakke et al. ............. | 370/229 |
| 2009/0111488 A1* | 4/2009 | Vau et al. ....................... | 455/466 |
| 2009/0216889 A1* | 8/2009 | Hadi ............................ | 709/228 |
| 2011/0173549 A1* | 7/2011 | Hipskind ....................... | 715/756 |
| 2011/0231212 A1* | 9/2011 | Hurley et al. ...................... | 705/5 |
| 2011/0296217 A1* | 12/2011 | Nishimura et al. ............ | 713/323 |
| 2011/0320310 A1* | 12/2011 | Brewer ...................... | 705/26.35 |
| 2012/0072051 A1* | 3/2012 | Koon et al. ....................... | 701/2 |
| 2012/0096177 A1* | 4/2012 | Rasanen ....................... | 709/228 |
| 2012/0179602 A1* | 7/2012 | Wheelock ....................... | 705/39 |

* cited by examiner

*Primary Examiner* — Tesfay Yohannes

(57) ABSTRACT

A kiosk may be accessible to the public and may include a keyboard, a display, a pointing device, and a device interface. The device interface may be configured to temporarily establish a communication interface with a handheld wireless mobile communication device in the vicinity of the kiosk so as to cause the keyboard, display, and pointing device on the kiosk to function as a user interface to the handheld wireless mobile communication device. A session management system may be configured to establish a session between each of the handheld wireless mobile communication devices and one or more user-selected application programs while each handheld wireless mobile communication device is interfaced to one of the kiosks, to maintain the session after the communication interface is broken, and to permit the session to be continued after the handheld wireless mobile communication device is subsequently interfaced to a different kiosk.

17 Claims, 3 Drawing Sheets

CONTINUOUS CLOUD COMPUTING SESSIONS USING HANDHELD MOBILE COMMUNICATION DEVICE INTERFACED TO DIFFERENT KIOSKS

BACKGROUND

1. Technical Field

This disclosure relates to handheld wireless mobile communication devices, such as smart phones, which have the capacity to perform various computing functions.

2. Description of Related Art

Handheld wireless mobile communication devices, such as smart phones, may have the capacity to perform various computing functions, such as to send and receive email and to create and modify documents, such as word processing documents and spreadsheets.

To maximize portability, the size of these handheld mobile communication devices may be small. In turn, this may result in a correspondingly small user interface which may be difficult to use. For example, the screens and keyboards on handheld wireless mobile communication devices are usually much smaller than those used with desktops. This small size can impede the user's ability to quickly and accurately enter and receive information.

Another problem with mobile computing is that travel plans may impede the ability to complete a particular computing project while at the same location. This may require the user to close the applications and their associated files which are being used before completing the project for which they are intended and to reopen these applications and files at other locations during a trip. The process of closing and reopening applications and associated files can be time consuming. Synchronization problems can also arise when efforts are made to continue the same work while working on different computing platforms.

SUMMARY

A computer network may include a plurality of geographically-distributed kiosks, a plurality of handheld wireless mobile communication devices, and a session management system.

Each kiosk may be accessible to the public and may include a keyboard, a display, a pointing device, and a device interface. The device interface may be configured to temporarily establish a communication interface with a handheld wireless mobile communication device in the vicinity of the kiosk so as to cause the keyboard, display, and pointing device on the kiosk to function as a user interface to the handheld wireless mobile communication device.

Each handheld wireless mobile communication device may include a kiosk interface configured to temporarily establish a communication interface with one of the kiosks in the vicinity of the handheld wireless mobile communication device so as to cause a keyboard, display, and pointing device on the kiosk to function as a user-interface to the handheld wireless mobile communication device.

The session management system may be configured to establish a session between each of the handheld wireless mobile communication devices and one or more user-selected application programs while each handheld wireless mobile communication device is interfaced to one of the kiosks, to maintain the session after the communication interface is broken, and to permit the session to be continued after the handheld wireless mobile communication device is subsequently interfaced to a different kiosk.

Each kiosk may be unable to communicate with the session management system when a handheld wireless mobile communication device is not interfaced to the kiosk.

At least one of the handheld wireless mobile communication devices may include a cell phone.

At least one of the handheld wireless mobile communication devices may be configured to wirelessly communicate with a cellular network system using 3G or 4G.

The session management system may be configured to require authentication information each time before establishing a session and each time before permitting a session to be continued after the communication interface is broken between the handheld wireless mobile communication device which established the session and the kiosk to which it is interfaced. The authentication information may include encrypted information stored on the handheld wireless mobile communication device and information entered by a user of the handheld wireless mobile communication device through the user interface.

At least one of the handheld wireless mobile communication devices may store a network address of the session management system.

A computer network communication process may include establishing a first communication interface between the handheld wireless mobile communication device and the kiosk. The user interface may be used to establish a session between the handheld wireless mobile communication device and a session management system and to direct that at least one application program be loaded and run during the session. While the at least one application program is running during the session, the first communication interface may be broken, without disrupting the session, including the running of the at least one application program. A second communication interface may then be established between the handheld wireless mobile communication device and a second kiosk of a similar type as the first kiosk. The user interface in the second kiosk may be used to reestablish the session between the handheld wireless mobile communication device and the session management system at the point where the session was when the first communication interface was broken without the user reloading the at least one application program or otherwise taking steps to return the at least one application program to the state it was at when the first communication interface was broken.

First authentication information may be provided to the session management system before establishing the session. The first authentication information may include encrypted information stored on the handheld wireless mobile communication device and information entered by a user of the handheld wireless mobile communication device through the user interface in the first kiosk.

Second authentication information may be provided to the session management system before reestablishing the session. The second authentication information may include the encrypted information stored on the handheld wireless mobile communication device and information entered by a user of the handheld wireless mobile communication device through the user interface in the second kiosk.

The communication interface may or may not be wireless.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
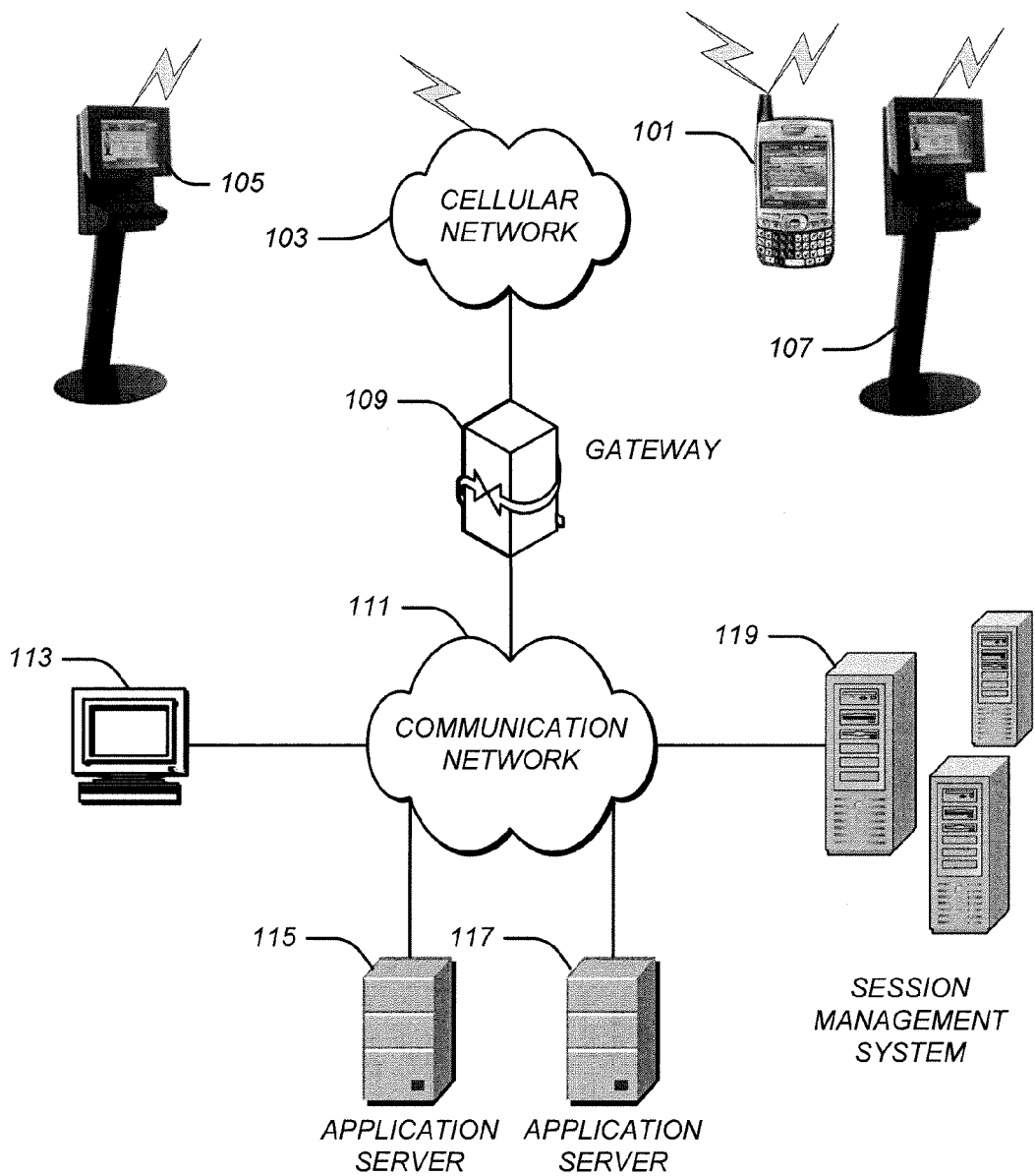
FIG. 1 illustrates an example of a computer network containing multiple kiosks, a handheld wireless mobile communication device interfaced to one of the kiosks, a session management system, and application servers.

FIG. 1 illustrates an example of a computer network containing multiple kiosks, a handheld wireless mobile communication device interfaced to one of the kiosks, a session management system, and application servers.

The computer network may include one or more handheld wireless mobile communication devices. These may be of any type. For example, the devices may consist of or include a smart phone, such as a smart phone 101, a PDA, a laptop, or a tablet. The phrase "handheld" means that the wireless mobile communication device is sized to be carried and used while being held.

Each handheld wireless mobile communication device may include user interface devices, such as a display, keyboard, and/or a track pad. These user interface devices may be much smaller than the ones normally used with desktop computers and thus may difficult to use.

The handheld wireless mobile communication devices may be configured to communicate wirelessly with one or more cellular networks, such as a cellular network 103. Each cellular network may include a plurality of geographically-distributed cell sites, each configured to communicate with a plurality of wireless mobile communication devices in its vicinity.

The computer network may include a plurality of geographically-distributed kiosks, such as kiosk 105 and 107. Each kiosk may be at publicly-accessible locations, such as at an airport, hotel, restaurant, school, library, or shopping center. A kiosk may instead be at a private location, such as a company or hotel.

A gateway 109 may be configured to facilitate communications between the cellular network 103 and another communication network 111. The other communication network 111 may consist of or include the Internet, a wide area network, a local area network, and/or a combination of these. Other communication systems may be configured to communicate with the communication network 111, such as a desktop computer 113, application servers 115 and 117, and a session management system 119.

Each of the handheld wireless mobile communication devices, such as the smart phone 101, may be configured to interface with the kiosks, as will be described below in more detail. The session management system 119 may be configured to establish a session with each of the handheld wireless mobile communication devices while each handheld wireless mobile communication device is interfaced to one of the kiosks. The session management system 119 may be configured to maintain the session after the communication interface is broken and to permit the session to be continued after the handheld wireless mobile communication device is subsequently interfaced to a different kiosk. An example of such a process is described below in connection with the discussion of FIG. 4.

The session management system 119 may consist of or include one or more servers communicatively coupled to the communication network 111. Each server may be configured to simultaneously run one or more application programs for a user, such as one or more email application programs, word processing application programs, spreadsheet application programs, instant messaging application programs, and/or internet browsers. One or more of these application programs may be hosted locally as part of the session management system 119 or remotely through one or more application program servers, such as the application program servers 115 and 117.

The session management system 119 may be configured to establish a session between each of the handheld wireless mobile communication devices and one or more user-selected application programs, while each handheld wireless mobile communication device is interfaced to one of the kiosks. The session management system 119 may be configured to maintain each session after the communication interface is broken, and to permit the session to be continued after the handheld wireless mobile communication device is subsequently interfaced to a different kiosk. This allows applications to currently run and to be automatically interrupted and reinstated at a point of termination when desired by the user. An example of this process is described below in connection with the discussion of FIG. 4.

Figure 2:
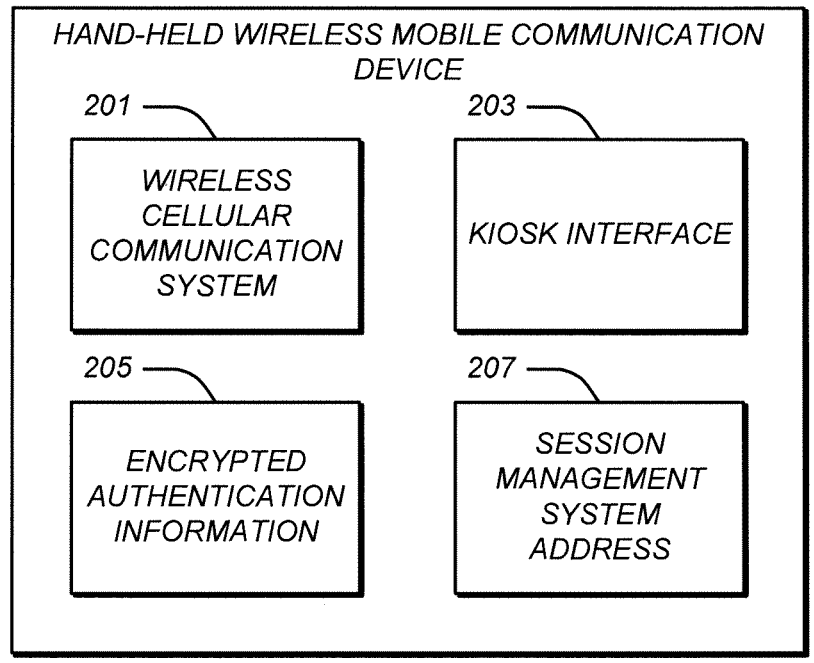
FIG. 2 illustrates an example of the handheld wireless mobile communication device illustrated in FIG. 1.

FIG. 2 illustrates an example of the handheld wireless mobile communication device illustrated in FIG. 1. The handheld wireless mobile communication device illustrated in FIG. 2 may be used in computer networks different from the one illustrated in FIG. 1. Similarly, the handheld mobile communication device illustrated in FIG. 1 may be configured differently than as is illustrated in FIG. 2.

As illustrated in FIG. 2, the handheld wireless mobile communication device may include a wireless cellular communication system 201, a kiosk interface 203, encrypted authentication information 205, and a session management system address 207.

The wireless cellular communication system 201 may be configured to communicate wirelessly with a cellular network, such as the cellular network 103. The cellular communication system 201 may include a transceiver and related communication components which are configured to communicate wirelessly with the cellular network 103. The wireless cellular communication system 201 may be configured to communicate with the cellular network 103 using 3G or 4G technology or any other communication technology.

The kiosk interface 203 may be configured to temporarily establish a communication interface with a kiosk which is in the vicinity of the handheld wireless communication device, such as with the kiosk 107 illustrated in FIG. 1, such as when the wireless communication device is within a short distance from the kiosk. The kiosk interface 203 may be configured to cause a keyboard, display, pointing device, and/or sound system which is part of the kiosk to function as a user interface to the handheld wireless mobile communication device.

The kiosk interface 203 may be of any type. For example, the kiosk interface 203 may consist of or include a wireless Bluetooth and/or Wi-Fi transceiver. The kiosk interface may in addition or instead include a port, such as a USB port, through which these communications may take place. The kiosk interface 203 may in addition or instead be configured to mechanically mate with a corresponding interface on a kiosk, such as with a docking station on the kiosk.

The encrypted authentication information 205 may be stored in a memory device within the handheld mobile communication device. The encrypted authentication information 205 may consist of or include a key and/or digital certificate which the handheld wireless mobile communication device is configured to provide as part of a log-in process with the session management system 119. The key may be established following an initial handshake of the device, such as when the user establishes a session for the first time. An example of such a log-in process is described below in connection with the discussion of FIG. 4.

The session management system address 207 may be stored in a memory device within the handheld mobile communication device. The address may be embedded in the application which manages the communication which may come with the device when purchased or downloaded from an application store at a later time. The session management system address 207 may consist of or include a network address for the session management system 119, such as a URL address. This address may enable the handheld wireless mobile communication device to establish a communication session with the session management system 119. An example of such a process is described below in connection with the discussion of FIG. 4.

The handheld wireless mobile communication device may have a microprocessor, RAM, one or more data storage devices, an operating system, and other hardware and software to enable the handheld wireless mobile communication device to perform a broad variety of computing functions. The handheld wireless mobile communication device may include a user interface, such as a display, keyboard, and pointing device. This user interface may be deactivated when the handheld mobile communication device is interfaced to a kiosk.

Figure 3:
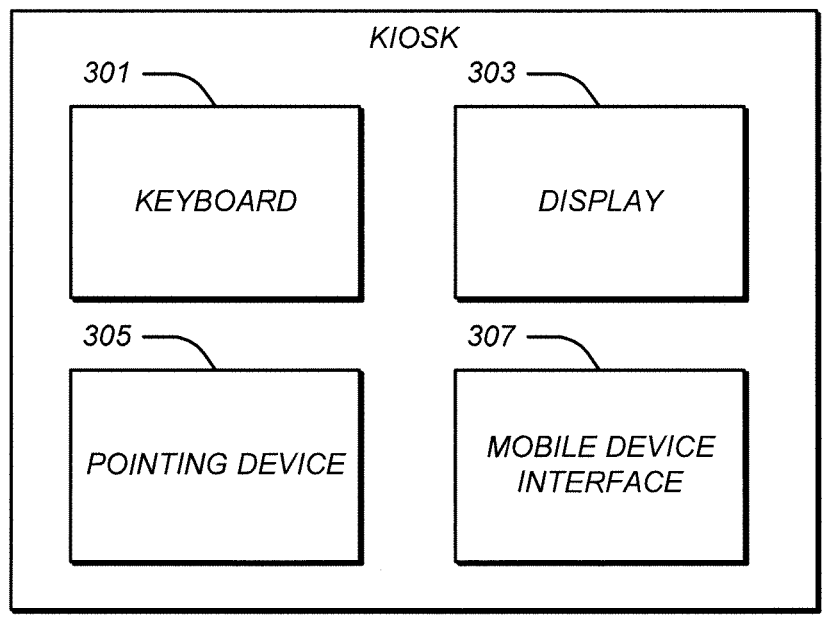
FIG. 3 illustrates an example of one of the kiosks illustrated in FIG. 1.

FIG. 3 illustrates an example of one of the kiosks illustrated in FIG. 1. The kiosk illustrated in FIG. 3 may be used in connection with communication networks which are different from the one illustrated in FIG. 1. Similarly, the kiosk illustrated in FIG. 1 may be different from the one illustrated in FIG. 3.

As illustrated in FIG. 3, the kiosk may include a keyboard 301, a display 303, a pointing device 305, and a mobile device interface 307. The kiosk may also have a sound system. The kiosk may be any type of device that is configured to interface with a wireless mobile communication device. It may be a stand alone station or may be integrated with another device, system, article of furniture, or other structure. Some employers may prefer that employees not access sessions from a public kiosk due to security reasons. One manner to accomplish this is to add an additional security consideration that links sessions to group IDs at the server level (cloud level). The group ID may be of different types, e.g., individual, corporate (secure), corporate (unsecure). If a group ID is a corporate (secure) type of ID, a special set of rules may be applied, as defined by the corporation. In one example, after obtaining the ID and determining that it is a corporate (secure) ID, the server determines that the session is restricted for use only at a private kiosk. In this case, if the user attempts to reestablish the session using a public kiosk, the server rejects the access attempt. Instead, an error message would be returned to the kiosk and/or device. In this case, when attempting to establish the session each kiosk provides an identifier that either contains a code of the kiosk type or the server may perform a lookup to a storage (local or remote to the server) to determine the kiosk type. An override may also be provided so that in times of urgency, even if a session would normally not be able to be established due to the corporate rules, the user may enable the session to be established. In this case, the user may be requested to confirm the override and/or the session may be flagged for later review by the corporation.

The pointing device 305 may be of any type. For example, the pointing device 305 may consist of or include a mouse, a track pad, and/or a touch screen.

The keyboard 301, the display 303, and the pointing device 305 may be "full-sized" devices. For example, the keyboard 301 may be of a size commonly used in connection with desktop computers, such as traditional 101 or 104 key keyboards. Similarly, the display 303 may have a diagonal which is 15, 17, 19, or more inches. The pointing device 305, for example, may be a full sized mouse.

The mobile device interface 307 may be configured to temporarily establish a communication interface with a handheld wireless mobile communication device which is in the vicinity of the kiosk, such as with the smart phone 101 illustrated in FIG. 1 and through the kiosk interface 203. The mobile device interface 307 may be configured so as to cause the keyboard 301, the display 303, the pointing device 305, and any sound system which may be present to function as a user interface to the handheld wireless mobile communication device which is in the vicinity of the kiosk. This may be in addition to or in lieu of the user interface which is provided as part of the handheld wireless mobile communication device in much the same manner that multiple screens are used with computers.

The mobile device interface 307 may be of any type. For example, the mobile device interface 307 may consist of or include a wireless Bluetooth and/or Wi-Fi transceiver. The mobile device interface 307 may in addition or instead include a port, such as a USB port, through which these communications may take place. The mobile device interface 307 may be configured to mechanically mate with a handheld wireless mobile communication device. For example, the mobile device interface 307 may include a docking station configured to hold, support, and interface with a handheld wireless mobile communication device.

The kiosk may lack the necessary hardware and/or software to be able to communicate with the session management system 119 when a handheld wireless mobile communication device is not interfaced to the kiosk. Thus, the kiosk may not be able to alone communicate with a computer network or provide computing functions to a user. Once interfaced to a handheld wireless mobile communication device, and once the handheld wireless mobile communication device has established a session with the session management system 119, moreover, the kiosk and handheld wireless mobile communication device may function in combination as a user interface with respect to the session management system 119.

Figure 4:
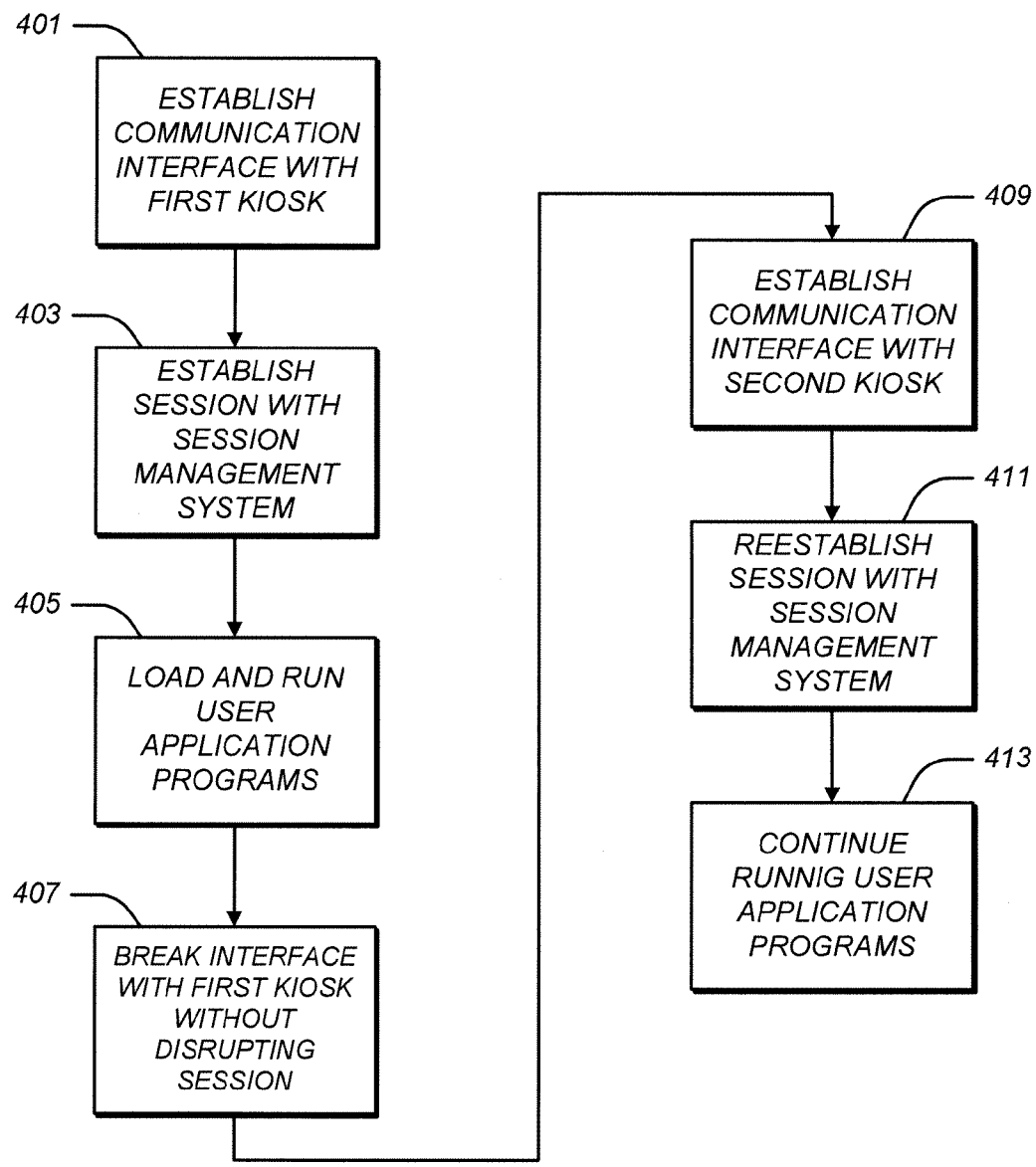
FIG. 4 illustrates an example of a computer network communication process using the handheld mobile communication device illustrated in FIG. 1 which results in a continuous computing session while at different docked locations.

FIG. 4 illustrates an example of a computer network communication process using the handheld mobile communication device illustrated in FIG. 1 which results in a continuous computing session while at different docked locations. The process illustrated in FIG. 4 may be implemented by a computer network which is different from the one illustrated in FIG. 1. Similarly, the computer network illustrated in FIG. 1 may implement a process which is different from the one illustrated in FIG. 4.

A communication interface may be established between a handheld wireless mobile communication device, such as the smart phone 101, and a first kiosk, such as the kiosk 107. This interface may cause the keyboard, display, and pointing device on the first kiosk to function as a first user interface to the handheld wireless communication device. This is illustrated in FIG. 4 as an Established Communication Interface With First Kiosk step 401.

The Established Communication Interface With First Kiosk step 401 may be effectuated by any means. For example, the communication interface between the kiosk and the handheld wireless mobile communication device may be established using a wireless Bluetooth connection and/or a wireless Wi-Fi connection. In addition or instead, the communication interface may be established by plugging a USB cable in a port in the kiosk and/or the handheld wireless mobile communication device. The communication interface may in addition or instead be established by placing the handheld wireless mobile communication device within a docking station on the kiosk which may be configured for this purpose.

The keyboard, display, and/or pointing device on the kiosk may then be used to establish a session between the handheld wireless mobile communication device and the session management system 119, as illustrated by an Establish Session With Session Management System step 403. During this step, the handheld wireless mobile communication device operating under the control of the user interface provided by the kiosk may initiate a communication with the session management system 119, such as by using, for example, the session management system address 207 which may be stored in the handheld wireless mobile communication device. The keyboard, display, and pointing device in the kiosk and the handheld wireless mobile communication device may in combination function as a dumb terminal during this process. These communications may pass through the cellular network 103, the gateway 109, and the communication network 111.

The session management system 119 may request authentication information from the handheld wireless mobile communication device as part of the process of establishing a session to verify the authenticity of the user and/or the handheld wireless mobile communication device. In other words, there may be multiple pieces of authorization information, e.g., one for the user and one for the device. The keyboard, display, and pointing device in the kiosk and the handheld wireless mobile communication device may in combination function as a user interface during this process. These communications may pass through the cellular network 103, the gateway 109, and the communication network 111.

Any type of authentication information and process may be used. For example, a two-part authentication process may be used. First, the session management system 119 may request that the user enter authentication information using the keyboard and/or pointing device on the kiosk, such as a user name and/or a password. After (or before) this information is entered by the user, the session management system 119 may request encrypted information which is stored in the handheld wireless mobile communication device, such as the encrypted authentication information 205. As indicated above, this may be a key or digital certificate. This internally-stored authentication information may be provided by the handheld wireless mobile communication device automatically, without the necessity for user input.

After a session is established, the user may then use the keyboard, display, and/or pointing device in the kiosk to direct that one or more user applications be loaded and run in the session management system 119, as reflected by a Load and Run User Applications step 405. For example, the user may open a browser and start surfing the internet, writing a word processing document, and entering data into a spreadsheet. The keyboard, display, and pointing device in the kiosk and the handheld wireless mobile communication device may in combination function as a user interface during this process. These communications may pass through the cellular network 103, the gateway 109, and the communication network 111.

One or more of these application programs may run in the session management system 119 under the management of the session management system 119. One or more of these application programs may instead run in the application server 115 and/or 117, but still under the management of the session management system 119. As indicated above, the kiosk and interfaced handheld wireless mobile communication device may function as a dumb terminal during these communications, merely communicating keyboard and pointing device information entered by the user on the kiosk to the session management system 119 and communicating visual information from the session management system 119 to the display on the kiosk.

The user may need to disrupt the session before the user completes the work which the user was performing on one or more applications to enable the user to travel to a different location. The user may therefore disconnect from the kiosk to which it was interfaced, thus breaking this interface, without disrupting the session in the session management system 119, as reflected by a Break Interface With First Kiosk Without Disrupting Session step 407.

The specific action which the user takes to break the interface may vary. For example, if the connection to the kiosk is wireless, the user may move the handheld wireless mobile communication device away from the kiosk, which may automatically break the interface. If a wired connection is used, on the other hand, the user may break the wired connection, such as, for example, by unplugging a USB cable from a port on the handheld wireless mobile communication device and/or the kiosk. In other circumstances, the user may remove the handheld wireless mobile communication device from a docking station on the kiosk in which it was placed. In still further circumstances, the interface may be terminated automatically, such as after a pre-determined period of time. In such a case, the user may be warned about the termination before it takes place.

A kiosk may also go off line due to scheduled or unscheduled maintenance. The kiosk may provide the user with directions to a different kiosk or kiosks before this takes place.

In some configurations, the user may communicate with the session management system 119 before breaking the interface with the kiosk. This may enable the session management system 119 to know that the interface is about to be broken and to take the steps which are necessary for fully preserving the current state of the session with the user. The session management system 119 may store the current state of the session on a hard drive for later recall or simply leave it in volatile memory for later access. Such a communication, for example, may consist of or include the user clicking a "suspend session" or similarly worded button on the kiosk and/or the wireless mobile communication device. In other configurations, the mere breaking of the interface may itself serve as notice to the session management system 119 that the session has been suspended, but that the last status of the session should be fully preserved.

The user may then travel to a different location and establish a communication interface between the handheld wireless mobile communication device and a second kiosk, as reflected by an Establish Communication Interface With Second Kiosk step 409. The user may establish the communication interface between the handheld wireless mobile communication device and the second kiosk using any of the techniques which are discussed above in connection with the established communication interface with the first kiosk step 401.

After establishing the communication interface with the second kiosk, the user may then reestablish the session with the session management system 119, as reflected by a Reestablish Session With Session Management System step 411. This step may include any of the types of authentication steps that are described above in connection with the Established Session with Session Management System step 403.

After reestablishing the session, the user may then continue running the user application programs, as reflected by a Continue Running User Application Programs step 413. Before doing so, the user may not need to reload the application programs or any of the files associated with them, such as opening a word processing and/or spreadsheet document. Rather, the entire state of the user's session as it existed when the interface was broken with the first kiosk may simply reappear upon reestablishment of the session, without the user having to take any steps to recreate this session.

The user may then break the interface with the second kiosk, again without disrupting the session, and travel to a third kiosk to reestablish the session. This process of breaking and then reestablishing a session at a different kiosk may continue indefinitely. At some point, such as at before breaking the interface with the first, second or third kiosk, the user may direct the session management system to terminate the session, such as by clicking on a "terminate session" or similarly worded button on the kiosk and/or the wireless mobile communication device. This action may bring the session to an end, causing any files which the user may have been working on to be closed and any applications to be terminated. Such applications and files may then be reloaded in whole or in part at such time as the user creates a new session.

Unless otherwise indicated, the session management system 119 and the application servers 115 and 117 may each be implemented with a computer system configured to perform the functions which have been described herein for them. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, mice, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, the handheld wireless mobile communication device may be configured to interface with a keyboard, display, and/or pointing device which is not part of a publicly-accessible kiosk, such as a keyboard, display, and pointing device which may be part of a desktop computer or other type of computing system. When so interfaced, the keyboard, display, and pointing device may function in the same way as these interface components function in the kiosk, as discussed above. This configuration may thus enable a user to start or continue with a computing session while at home, work, or another location. A keyboard, display, and/or pointing device on the handheld wireless mobile communication device may similarly be used to start or continue with a session on the session management system 119.

Similarly, the session management system 119 may be configured to permit a user to create or log-in to an ongoing session from a completely different computing platform, such as from a desktop computer which is connected to the internet. This may enable a user to create and/or continue with a session, without using the handheld wireless mobile communication device.

The display and any associated sound system which a kiosk may have may be used for advertising when the kiosk is not interfaced to a handheld wireless mobile communication device. The advertisements may be of any type. For example, the advertisements may include photographs and/or videos of products and/or services which are displayed on the display and/or related audio, such as narration, music, etc. This advertising may be seen and heard by people as they walk by the unused kiosk.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A network comprising:
    a plurality of kiosks including a first kiosk and a second kiosk, different from the first kiosk, each kiosk containing a respective plurality of user I/O devices, and each respective kiosk being connectable with a handheld wireless mobile communication device via a communication connection when the handheld wireless mobile communication device is disposed local to the respective kiosk so as to cause the respective I/O devices of the respective kiosk to function as a corresponding user input and output interface of the handheld wireless mobile communication device; and
    a session management system configured to continue a session, established via the handheld wireless mobile communication device with an application when a first communication connection with the first kiosk is operational and providing the application to a user interfacing with the handheld wireless mobile communication device using the I/O devices of the first kiosk, after the first communication connection is terminated and a second communication connection between the handheld wireless mobile communication device and the second kiosk is subsequently established for providing the application to the user interfacing with the handheld wireless mobile communication device using the I/O devices of the second kiosk,
    wherein:
    the session management system is configured to continue the session by restarting operation of a user-selected application program, suspended after termination of the communication connection, when the second communication connection is established; and
    at least one of the following:
    the session management system is configured to automatically preserve a current state of the session when the first communication connection is terminated to enable the session to continue without interruption when the second communication connection is established, unless provided with a predetermined input by a user of the handheld wireless mobile communication device, the predetermined input indicating that the session is to be terminated;
    the session management system is configured to determine a session type of the session and in response apply different rules for accessing the session; or
    the first kiosk is configured to provide the user with directions to one or more different kiosks prior to the termination of the first communication connection with the handheld wireless mobile communication device due to different circumstances.

2. The network of claim 1, wherein the user-selected application program runs at a geographical location remote from the first kiosk and the second kiosk.

3. The network of claim 1 wherein the first kiosk is able to communicate with the session management system only through the handheld wireless mobile communication device.

4. The network of claim 1 wherein the session management system is further configured to require authentication information before continuing the session, the authentication information including encrypted information stored on the handheld wireless mobile communication device and information entered by a user of the handheld wireless mobile communication device through the I/O devices of the first kiosk or the second kiosk.

5. The network of claim 1 wherein the I/O devices of the first kiosk function in place of user I/O devices of the handheld wireless mobile communication device when the handheld wireless mobile communication device and first kiosk are connected by the first communication connection.

6. The network of claim 1 wherein the first kiosk acts as a dumb terminal when connected to the handheld wireless mobile communication device by the first communication connection.

7. The network of claim 1 wherein the session management system, in response to the user of the handheld wireless mobile communication device providing a predetermined input indicating that the first communication connection is about to be terminated, preserves a current state of the session to enable the session to continue without interruption when the second communication connection is established.

8. The network of claim 1 wherein the plurality of I/O devices of each of the first and second kiosks includes a pointing device.

9. A kiosk-enhanced communication method, the method comprising:
    establishing a first communication connection between a first kiosk and a local handheld wireless mobile communication device;
    establishing a second communication connection between a second kiosk and the local handheld wireless mobile communication device after the first communication connection has been terminated;
    maintaining a state of a session between the local handheld wireless communication device and an application, the session running to provide the application to a user interfacing with the first kiosk during when the first communication connection is operational wherein the application is running on an application server distal to the first and second kiosks, such that the session is able to continue, uninterrupted from the point at which the first communication connection was terminated after the second communication connection is established, to provide the application to the user interfacing with the second kiosk during when the second communication connection is operational; and
    restarting the session after the second communication connection is established to continue the session,
    wherein the first and second communication connections respectively enable respective user I/O devices of the first kiosk and the second kiosk to function as corresponding user input and output interfaces of the handheld wireless mobile communication device.

10. The method of claim 9 wherein the first and the second kiosks are able to communicate with the session only through the handheld wireless mobile communication device.

11. The method of claim 9 further comprising delivering authentication information before initiating the session, the authentication information including encrypted information stored on the local handheld wireless mobile communication device and information entered by a user of the handheld wireless mobile communication device through I/O devices.

12. The method of claim 9 wherein user I/O devices of the first and second kiosk function in place of user I/O devices of the handheld wireless mobile communication device when the handheld wireless mobile communication device and the first and second kiosks are connected by the first and second communication connections respectively.

13. The method of claim 9 wherein each of the first and second kiosks acts as a dumb terminal when connected to the handheld wireless mobile communication device by the respective first and second communication connections.

14. The method of claim 9 wherein, in response to the user of the handheld wireless mobile communication device providing a predetermined input indicating that the first communication connection is about to be terminated, the session preserves a current state of the session to enable the session to continue without interruption when the second communication connection is established.

15. The method of claim 9 wherein a current state of the session is automatically preserved when the first communication connection is terminated to enable the session to continue without interruption when the second communication connection is established, unless provided with a predetermined input by, the user of the handheld wireless mobile communication device, the predetermined input indicating that the session is to be terminated.

16. The method of claim 9 the first and second kiosks each includes a pointing device and wherein each pointing device functions as a user interface to the wireless mobile communication device during the respective first and second communication connections between the handheld wireless mobile communication device and the first and second kiosks.

17. The network of claim 1, wherein the session management system is further configured to run simultaneously a plurality of application programs selected from a group consisting of email application programs, word processing application programs, spreadsheet application programs, instant messaging application programs and internet browsing application programs.

* * * * *